United States Patent
Gong et al.

(10) Patent No.: US 10,224,522 B2
(45) Date of Patent: Mar. 5, 2019

(54) SEALING ASSEMBLY, LITHIUM ION BATTERY COMPRISES THE SAME, AND METHOD FOR PREPARING SEALING ASSEMBLY

(71) Applicants: Shenzhen BYD Auto R&D Company Limited, Shenzhen, Guangdong (CN); BYD Company Limited, Shenzhen (CN)

(72) Inventors: Qing Gong, Shenzhen (CN); Xinping Lin, Shenzhen (CN); Longfei Zhou, Shenzhen (CN); Weifeng Zhang, Shenzhen (CN)

(73) Assignees: SHENZHEN BYD AUTO R&D COMPANY LIMITED, Guangdong, Shenzhen (CN); BYD COMPANY LIMITED, Guangdong, Shenzhen (CN)

( * ) Notice: Subject to any disclaimer, the term of this patent is extended or adjusted under 35 U.S.C. 154(b) by 1013 days.

(21) Appl. No.: 14/368,581

(22) PCT Filed: Dec. 26, 2012

(86) PCT No.: PCT/CN2012/087591
§ 371 (c)(1),
(2) Date: Jun. 25, 2014

(87) PCT Pub. No.: WO2013/097730
PCT Pub. Date: Jul. 4, 2013

(65) Prior Publication Data
US 2015/0004479 A1  Jan. 1, 2015

(30) Foreign Application Priority Data
Dec. 28, 2011 (CN) .......................... 2011 1 0446810

(51) Int. Cl.
*H01M 2/08* (2006.01)
*H01M 10/0525* (2010.01)
(Continued)

(52) U.S. Cl.
CPC ................. *H01M 2/08* (2013.01); *B22F 3/11* (2013.01); *B22F 7/08* (2013.01); *C22C 1/0475* (2013.01);
(Continued)

(58) Field of Classification Search
CPC ..................................................... H01M 2/065
See application file for complete search history.

(56) References Cited

U.S. PATENT DOCUMENTS 4,898,393 A * 2/1990 Rollins .................. F16J 15/008
277/500
5,011,725 A    4/1991 Foster
(Continued)

FOREIGN PATENT DOCUMENTS

CN    101350403 A    1/2009
CN    101593819 A    12/2009
(Continued)

OTHER PUBLICATIONS

International Search Report and Written Opinion for Application No. PCT/CN2012/087591 dated Mar. 28, 2013.

*Primary Examiner* — Stephan J Essex
(74) *Attorney, Agent, or Firm* — David D. Brush; Westman, Champlin & Koehler, P.A.

(57) ABSTRACT

A sealing assembly for a battery, a method of preparing the sealing assembly and a lithium ion battery are provided. The sealing assembly for a battery comprises: a ceramic ring (3) having a receiving hole (31), a metal ring (4) fitted over the ceramic ring (3) for sealing an open end of the battery, and a column (2) formed in the receiving hole (31) which
(Continued)

comprises a metal-metal composite (21), wherein the metal-metal composite (21) comprises: a metal porous body, and a metal material filled in pores of the metal porous body.

17 Claims, 1 Drawing Sheet

(51) Int. Cl.
    *H01M 2/06*     (2006.01)
    *B22F 7/08*     (2006.01)
    *C22C 1/04*     (2006.01)
    *B22F 3/11*     (2006.01)
    *B22F 7/06*     (2006.01)

(52) U.S. Cl.
    CPC ....... *H01M 2/065* (2013.01); *H01M 10/0525* (2013.01); *B22F 2007/066* (2013.01); *B22F 2998/10* (2013.01); *Y10T 29/4911* (2015.01)

(56) References Cited

U.S. PATENT DOCUMENTS

| | | | |
|---|---|---|---|
| 6,268,079 B1 | 7/2001 | Inoue et al. | |
| 6,335,117 B1* | 1/2002 | Yoshida | H01M 2/065 |
| | | | 429/180 |
| 2003/0134194 A1* | 7/2003 | Lasater | C03C 8/24 |
| | | | 429/181 |
| 2003/0143460 A1 | 7/2003 | Yoshida et al. | |
| 2005/0287387 A1 | 12/2005 | Itoh et al. | |
| 2012/0328933 A1* | 12/2012 | Gong | H01M 2/08 |
| | | | 429/185 |

FOREIGN PATENT DOCUMENTS

| | | |
|---|---|---|
| EP | 0774315 A2 | 5/1997 |
| JP | 2000327442 A | 11/2000 |
| JP | 2001006656 A | 1/2001 |

* cited by examiner

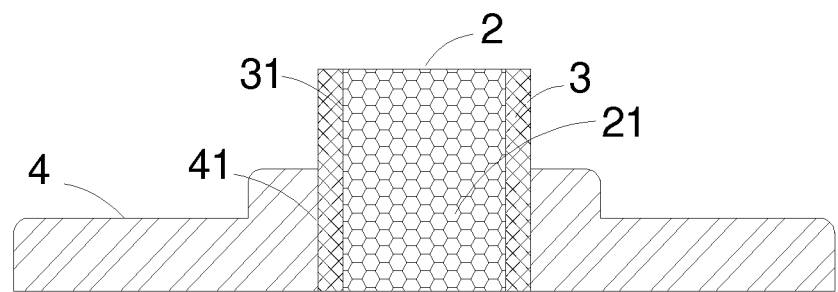

SEALING ASSEMBLY, LITHIUM ION BATTERY COMPRISES THE SAME, AND METHOD FOR PREPARING SEALING ASSEMBLY

CROSS-REFERENCE TO RELATED APPLICATION

The present application is a national phase entry under 35 U.S.C 371 of International Application No. PCT/CN2012/087591, filed Dec. 26, 2012, published in English, which claims priority from Chinese Application No. 201110446810.6 filed Dec. 28, 2011 all of which are incorporated herein by reference.

FIELD

The present disclosure relates to the field of battery, more particularly, to a sealing assembly for a battery and a method for preparing the sealing assembly, and also to a lithium ion battery comprising the sealing assembly.

BACKGROUND

The statements in this section merely provide background information related to the present disclosure and may not constitute prior art.

A cover plate and a core column of a sealing assembly are mainly sealed by means of a glass package in a sealing of a conventional lithium ion battery. The packaging glass may easily be corroded after a long term usage. And the packaging glass has a poor performance in shock strength and thermal shock resistance due to its brittleness.

Currently, the core column of a battery is mostly made of 4J series Kovar alloy. However, along with an increasing of battery capacity, the length and diameter of the core column will also be increased which may influence the normal work of the battery. Therefore, currently a new solution may be using aluminium for anode core column and using copper for a cathode core column, respectively. Since both aluminium and copper have lower resistivity which could greatly reduce actual resistance of the core column. Take the cathode core column for example, copper has a lower melting point of about 1083° C., while the temperature of the glass package is about 1000° C. which is approximate to the melting point of copper, so it is difficult to ensure quality of the package.

However, the current sealing assembly for a battery still needs to be further improved.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The object of the present disclosure is to solve at least one of the problems existing in the prior art to at least some extent.

According to embodiments of the present disclosure, a sealing assembly for a battery which has good stability and good thermal shock resistance may be provided.

According to embodiments of a first broad aspect of the present disclosure, there is provided a sealing assembly for a battery. The sealing assembly for the battery may comprise: a ceramic ring having a receiving hole; a metal ring fitted over the ceramic ring for sealing an open end of the battery, a column formed in the receiving hole which comprises a metal-metal composite, wherein the metal-metal composite comprises: a metal porous body; and a metal material filled in pores of the metal porous body.

According to embodiments of a second broad aspect of the present disclosure, there is provided a method of preparing a sealing assembly for a battery. The method of preparing the sealing assembly for the battery may comprise: providing a ceramic ring having a receiving hole; filing a mixture comprising a first metal and a second metal into the receiving hole of the ceramic ring, and sintering the mixture to obtain a metal porous body; filing a metal material into the receiving hole of the ceramic ring and above the sintered metal porous body, treating the metal material at a temperature above a melting point of the metal material to allow the melted metal material to infiltrate into the ceramic porous body, and obtaining a metal-metal composite after cooling; and welding a metal ring outside the ceramic ring.

According to embodiments of a third broad aspect of the present disclosure, there is provided a lithium ion battery. The lithium ion battery may comprise: a shell having at least one open end; a sealing assembly according to the above mentioned for sealing the open end to form a sealed space; and a pole core and an electrolyte solution received in the sealed space, wherein the metal ring of the sealing assembly is connected with the shell, and the core column of the sealing assembly is connected with the pole core.

With the sealing assembly according to embodiments of the present disclosure, the metal ring may be steadily and air tightly connected to the metal-metal composite. Especially, the expansion coefficient of the metal-metal composite may be regulated to be approximate to the expansion coefficient of the ceramic matrix by controlling compositions of the metal or alloy phase. The metal-metal composite is an electric conductor. The connection between the metal-metal composite and the ceramic ring may have higher stability than such other common connection between ceramic and metal, because in general, a ceramic may have an expansion coefficient different from expansion coefficient of a metal.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of examples of the present disclosure will become apparent and more readily appreciated from the following descriptions made with reference to the accompanying drawings, in which:

FIG. 1 is a schematic view of a sealing assembly for a battery according to an embodiment of the present disclosure.

DETAILED DESCRIPTION

Reference will be made in detail to embodiments of the present disclosure. The embodiments described herein with reference to drawing are explanatory, illustrative, and used to generally understand the present disclosure. The embodiments shall not be construed to limit the present disclosure.

The same or similar elements and the elements having same or similar functions are denoted by like reference numerals throughout the descriptions.

According to embodiments of the present disclosure, a sealing assembly for a battery is provided. Referring to FIG. 1, the sealing assembly for the battery may comprise: a ceramic ring 3, a metal ring 4, a column 2. And the ceramic ring 3 may be formed with a receiving hole 31, the metal ring 4 may be fitted over the ceramic ring 3 for sealing an open end of the battery, the column 2 may be formed in the receiving hole 31, and the receiving hole 31 may comprise a metal-metal composite 21, and according to embodiments of present disclosure, the metal-metal composite 21 may further comprise: a metal porous body and a metal material filled in pores of the metal porous body.

Advantageously, the metal material is filled in the pores of the metal porous body by means of melt infiltration.

In one embodiment of the present disclosure, the metal material is Cu, the metal porous body comprises a first metal and a second metal, and the first metal is Cu, the second metal is at least one selected from a group consisting of W and Mo.

Preferably, based on the total weight of the metal porous body, the content of the first metal is about 5 wt % to about 40 wt %, and the content of the second metal is about 60 wt % to about 95 wt %.

In one embodiment of the present disclosure, the metal porous body comprises Cu and Mo, and based on the total weight of the metal porous body, the content of Cu is about 10 wt % to about 40 wt %; the content of Mo is about 60 wt % to about 90 wt %.

In one embodiment of the present disclosure, the metal porous body comprises Cu and W, and based on the total weight of the metal porous body, the content of Cu is about 5 wt % to about 20 wt %; the content of W is about 80 wt % to about 95 wt %.

Advantageously, the ceramic ring 3 is one selected from a group consisting of alumina ceramic ring, zirconia ceramics ring, aluminum nitride ceramic ring, boron nitride ceramic ring, silicon nitride ceramic ring, and alumina-zirconia composite ceramic ring, and the metal ring is one selected from a group consisting of aluminum ring and aluminum alloy ring.

Advantageously, the weight ratio of the metal material to the metal porous body is about (1 to 2):(1 to 19).

In one embodiment of the present disclosure, the sealing assembly may be configured as a sealing assembly for a negative pole of the battery.

The sealing assembly of the present disclosure may be used for sealing a battery, mainly for sealing a cathode of a battery, more particularly for sealing a high power lithium ion battery, such as lithium ion power battery, lithium ion storage battery.

A lithium ion battery mainly comprises: a shell having at least one open end, a pole core disposed in the shell and an electrolyte solution received in the shell. In order to prevent the electrolyte solution from leaking, the at least one open end of the shell may be sealed by a sealing assembly. The shell receiving an electrolyte solution and having at least one open end may generally be made of aluminum or steel. The pole core may be formed by laminating anode sheet, a separator and a cathode sheet in turn and then coiling them; and the structure of the pole core and method for preparing the pole core are well known for a person skilled in the art.

The mainly improvement of the present disclosure is related to a sealing assembly of a battery, according to one embodiment of the present disclosure, the sealing assembly may comprise a ceramic ring 3 having a receiving hole 31; a metal ring 4 fitted over the ceramic ring 3 for sealing an open end of the battery, a column 2 formed in the receiving hole 31 which comprises a metal-metal composite 21, wherein the metal-metal composite comprises: a metal porous body; and a metal material filled in pores of the metal porous body.

Specifically, the metal ring 4 may be aluminum ring or aluminum alloy ring, and the metal ring 4 may be welded to a shell of a battery to seal an open end of the battery. Of course, the metal ring 4 may be made of a material same with the shell, such as steel. The metal ring 4 is connected to the shell of the battery (generally by welding) to realize a sealing connection between the sealing assembly of the present disclosure and the battery.

The metal ring 4 may be fitted over the ceramic ring 3. In one embodiment of the present disclosure, the metal ring may have a mounting hole 41 which has a pore diameter equal to the external diameter of the ceramic ring 3 in order to install the ceramic ring 3. It is worth to mention that, because the column 2 may be used as one pole of a battery, the shell may be as the other pole of the battery, and the metal ring 4 may be connected to the shell, the column 2 should be insulated from the metal ring 4. According to the present disclosure, the ceramic ring 3 may play a role as an insulator which could connect and insulate the column 2 and the metal ring 4.

The ceramic ring 3 may be one selected from a group consisting of alumina ceramic ring, zirconia ceramics ring, aluminum nitride ceramic ring, boron nitride ceramic ring, silicon nitride ceramic ring, and alumina-zirconia composite ceramic ring. In order to obtain a better bonding between the ceramic ring 3 and the metal-metal composite, an alumina ceramic ring or an alumina-zirconia composite ceramic ring is preferred.

The column 2 is connected and insulated with the metal ring 4 via a ceramic ring 3, the ceramic ring 3 has an excellent corrosion resistance which would prevent it from being corroded by electrolyte solution and give a longer service life of lithium ion battery. Moreover, the sealing assembly according to the present disclosure may have a more stably structure because the shock strength and thermal shock resistance of the ceramic ring 3 are better than a packaging glass, thus the sealing assembly according to the present disclosure may have a better sealing effect. In comparison to a ceramic plate, the ceramic ring 3 may have a thicker thickness which may result a better thermal shock resistance and thermal cycle performance.

According to one embodiment of the present disclosure, the ceramic ring 3 may have a receiving hole for making column 2, so the ceramic ring 3 may have certain thickness. It is preferred that the thickness of the ceramic ring 3 is about 6.2 mm to about 6.8 mm, the external diameter of the ceramic ring 3 is about ¢20±1 mm, the pore diameter of the receiving hole is about ¢10±1 mm.

The mainly improvement of the present disclosure is that the column 2 comprises a metal-metal composite 21.

According to one embodiment of the present disclosure, the column 2 comprises a metal-metal composite 21, the metal-metal composite 21 comprises: a metal porous body and a metal material, the metal-metal composite 21 and the ceramic ring form a ceramic-metal composite structure. The metal material is filled in the pores of the metal porous body.

The metal porous body comprises a first metal and a second metal, and the first metal is Cu, the second metal is at least one selected from a group consisting of W and Mo; and based on the total weight of the metal porous body, the content of the first metal is about 5 wt % to about 40 wt %, and the content of the second metal is about 60 wt % to about 95 wt %, the metal material is Cu.

According to embodiments of the present disclosure, the metal-metal composite not only has a good conductivity property, but also could realize a better electric connection with the pole core of a lithium ion battery. More important, the metal-metal composite and the ceramic ring may form a ceramic-metal composite integrally.

The metal material may infiltrate into the metal porous body through capillary forces to form an integral body with the metal porous body when the metal material is melted and filled in to the receiving hole of the ceramic ring and the above sintered metal porous body. The metal-metal composite would have a well combination with the ceramic ring to realize a reliable connection and good sealing effect of the sealing assembly.

According to embodiments of the present disclosure, a method of preparing a sealing assembly for a battery is provided. The method of preparing the sealing assembly for the battery may comprise: providing a ceramic ring having a receiving hole; filing a mixture comprising a first metal and a second metal into the receiving hole of the ceramic ring, and sintering the mixture to obtain a metal porous body; filing a metal material into the receiving hole of the ceramic ring and above the sintered metal porous body, treating the metal material at a temperature above a melting point of the metal material to allow the melted metal material to infiltrate into the ceramic porous body, and obtaining a metal-metal composite after cooling; and welding a metal ring to the ceramic ring so as to fit the metal ring over the ceramic ring.

Advantageously, the first metal and the second metal may be sintered at the same time to obtain the metal porous body.

In one embodiment of the present disclosure, the sintering is performed under a temperature of about 1200 to about 1400° C. for about 1 to 3 hours.

The metal ring may be soldered to the ceramic ring by means of brazing, wherein the brazing is performed under a temperature of about 570 to about 660° C. for about 5 to 30 minutes under a vacuum or an inert atmosphere.

In one embodiment of the present disclosure, in the step of brazing, an Al—Si alloy is used, wherein the weight of Si is about 12 wt % or less.

According to embodiments of the present disclosure, a lithium ion battery is provided. The lithium ion battery may comprise: a shell having at least one open end; a sealing assembly according to any one of mentioned above for sealing the open end to form a sealed space; and a pole core and an electrolyte solution received in the sealed space, wherein the metal ring of the sealing assembly is connected with the shell, and the core column of the sealing assembly is connected with the pole core.

With the sealing assembly according to embodiments of the present disclosure, the metal ring may be connected to the column through the ceramic ring, the connection between the shell and the column is an insulating and sealing connection. The column may be configured as an electrode of a battery for electric connecting with a core. The column comprises a metal-metal composite which comprises a metal porous body and a metal material filled in pores of the metal porous body. The metal porous body may be formed by filling a mixture consisting of a first metal and a second metal into the receiving hole of the ceramic ring and sintering them, thus the metal porous body may connect to the ceramic ring to a certain degree. Then the metal material is filled in the pores of the metal porous body by means of melt infiltration, the metal porous body may have a better connection with the ceramic ring, and the molten metal material may infiltrate in the interface between the ceramic ring and the metal porous body to form a good sealing connection. The component elements of the sealing assembly may have a reliable connection with each other and have a good sealing effect. Moreover, the ceramic ring has a good performance in corrosion resistance and insulating property which could increase service life of a lithium ion battery effectively.

The present disclosure will be described below in more detail with reference to the following embodiments.

Embodiment 1

This example is used to explain the sealing assembly and the method for preparing the sealing assembly according to the embodiments of the present disclosure.

The method for fabricating a sealing assembly of a battery, comprising:

Step 1, manufacturing a ceramic ring having a receiving hole: a ceramic powder which comprises 95 wt % of aluminum oxide and 5 wt % of boost-sintering glass phase, such as CaO—MgO—$Al_2O_3$—$B_2O_3$, were compressed to form a ceramic ring having a receiving hole therein by means of dry pressing. Then the ceramic ring was sintered under 1500° C.

Step 2, manufacturing a metal porous body: A W powder and a Cu powder was mixed to form a metal mixture by means of ball-milling. Based on the total weight of the metal mixture, the content of W powder was about 95 wt % and the content of Cu powder was about 5%. The metal mixture was compressed into a shape matching the receiving hole of the ceramic ring by means of compression molding. Then the compressed metal mixture was filled into the receiving hole of the ceramic ring and sintered in a welding furnace for 2 h to form a metal porous body. The sintering temperature was raised to 1350° C. with a heating speed of 5° C./min. The metal porous body was formed in the receiving hole of the ceramic ring.

Step 3, manufacturing a metal-metal composite: a Cu power was filled into the receiving hole of the ceramic ring and placed above the metal porous body, and then was treated at a temperature of 1250° C. for 2 h. The weight ratio of the copper powder and the metal porous body was about 1:19. The Cu power would infiltrate into the metal porous body and tightly seal the inner wall of the ceramic ring.

Step 4, installing the metal ring: a metal ring was welded to the ceramic ring so as to fit the metal ring over the ceramic ring at a temperature of 600° C. and under a vacuum atmosphere to form a sealing assembly A11. The scaling powder was Al—Si alloy.

Embodiment 2

This example is used to explain the sealing assembly and the method for preparing the sealing assembly according to the embodiments of the present disclosure.

The method for fabricating a sealing assembly of a battery, comprising:

Step 1, manufacturing a ceramic ring having a receiving hole: a ceramic powder which comprises 95 wt % of alumina was compressed to form a ceramic ring having a receiving hole therein by means of dry pressing. Then the ceramic ring was sintered under 1500° C.

Step 2, manufacturing a metal porous body: a W powder and a Cu powder was mixed to form a metal mixture by means of ball-milling. Based on the total weight of the metal mixture, the content of W powder was about 80 wt % and the content of Cu powder was about 20%. The metal mixture was compressed into a shape matching the receiving hole of the ceramic ring by means of compression molding. Then the compressed metal mixture was filled into the receiving hole of the ceramic ring and sintered in a welding furnace for 2 h to form a metal porous body. The sintering temperature was raised to 1400° C. with a heating speed of 5° C./min. The metal porous body was formed in the receiving hole of the ceramic ring.

Step 3, manufacturing a metal-metal composite: a Cu power was filled into the receiving hole of the ceramic ring and placed above the metal porous body, and then was treated at a temperature of 1230° C. for 2 h. The weight ratio between the copper powder and the metal porous body was about 1:4. The Cu power would infiltrate into the metal porous body and tightly seal the inner wall of the ceramic ring.

Step 4, installing the metal ring: a metal ring was welded to the ceramic ring so as to fit the metal ring over the ceramic ring at a temperature of 600° C. and under a vacuum atmosphere to form a sealing assembly A12. The scaling powder was Al—Si alloy.

Embodiment 3

This example is used to explain the sealing assembly and the method for preparing the sealing assembly according to the embodiments of the present disclosure.

The method for fabricating a sealing assembly of a battery, comprising:

Step 1, manufacturing a ceramic ring having a receiving hole: a ceramic powder which comprises 95 wt % of aluminum oxide was compressed to form a ceramic ring having a receiving hole therein by means of dry pressing. Then the ceramic ring was sintered under 1500° C.

Step 2, manufacturing a metal porous body: a Mo powder and a Cu powder was mixed to form a metal mixture by means of ball-milling. Based on the total weight of the metal mixture, the content of Mo powder was about 90 wt % and the content of Cu powder was about 10%. The metal mixture was compressed into a shape matching the receiving hole of the ceramic ring by means of compression molding. Then the compressed metal mixture was filled into the receiving hole of the ceramic ring and sintered in a welding furnace for 2 h to form a metal porous body. The sintering temperature was raised to 1300° C. with a heating speed of 5° C./min. The metal porous body was formed in the receiving hole of the ceramic ring.

Step 3, manufacturing a metal-metal composite: a Cu power was filled into the receiving hole of the ceramic ring and placed above the metal porous body, and then treated at a temperature of 1230° C. for 2 h. The weight ratio between the copper powder and the metal porous body was about 1:1. The Cu power would infiltrate into the metal porous body and tightly seal the inner wall of the ceramic ring.

Step 4, installing the metal ring: a metal ring was welded to the ceramic ring so as to fit the metal ring over the ceramic ring at a temperature of 600° C. and under a vacuum atmosphere to form a sealing assembly A13. The scaling powder was Al—Si alloy.

Embodiment 4

This example is used to explain the sealing assembly and the method for preparing the sealing assembly according to the embodiments of the present disclosure.

The method for fabricating a sealing assembly of a battery, comprising:

Step 1, manufacturing a ceramic ring having a receiving hole: a ceramic powder which comprises 95 wt % of aluminum oxide was compressed to form a ceramic ring having a receiving hole therein by means of dry pressing. Then the ceramic ring was sintered under 1500° C.

Step 2, manufacturing a metal porous body: a Mo powder and a Cu powder was mixed to form a metal mixture by means of ball-milling. Based on the total weight of the metal mixture, the content of Mo powder was about 60 wt % and the content of Cu powder was about 40%. The metal mixture was compressed into a shape matching the receiving hole of the ceramic ring by means of compression molding. Then the compressed metal mixture was filled into the receiving hole of the ceramic ring and sintered in a welding furnace for 2 h to form a metal porous body. The sintering temperature was raised to 1300° C. with a heating speed of 5° C./min. The metal porous body was formed in the receiving hole of the ceramic ring.

Step 3, manufacturing a metal-metal composite: a Cu power was filled into the receiving hole of the ceramic ring and placed above the metal porous body, and then treated at a temperature of 1240° C. for 2 h. The weight ratio between the copper powder and the metal porous body was about 1:9.5. The Cu power would infiltrate into the metal porous body and tightly seal the inner wall of the ceramic ring.

Step 4, installing the metal ring: a metal ring was welded to the ceramic ring so as to fit the metal ring over the ceramic ring at a temperature of 600° C. and under a vacuum atmosphere to form a sealing assembly A14. The scaling powder was Al—Si alloy.

Embodiment 5

This example is used to explain the sealing assembly and the method for preparing the sealing assembly according to the embodiments of the present disclosure.

The method for fabricating a sealing assembly of a battery, comprising:

Step 1, manufacturing a ceramic ring having a receiving hole: a ceramic powder which comprises 95 wt % of aluminum oxide was compressed to form a ceramic ring having a receiving hole therein by means of dry pressing. Then the ceramic ring was sintered under 1500° C.

Step 2, manufacturing a metal porous body: a Mo powder, a W powder and a Cu powder was mixed to form a metal mixture by means of ball-milling. Based on the total weight of the metal mixture, the content of Mo powder was about 60 wt %, the content of W powder was about 20% and the content of Cu powder was about 20%. The metal mixture was compressed into a shape matching the receiving hole of the ceramic ring by means of compression molding. Then the compressed metal mixture was filled into the receiving hole of the ceramic ring and sintered in a welding furnace for 2 h to form a metal porous body. The sintering temperature was raised to 1300° C. with a heating speed of 5° C./min. The metal porous body was formed in the receiving hole of the ceramic ring.

Step 3, manufacturing a metal-metal composite: a Cu power was filled into the receiving hole of the ceramic ring and placed above the metal porous body, and then treated at a temperature of 1235° C. for 2 h. The weight ratio between the copper powder and the metal porous body was about 2:1. The Cu power would infiltrate into the metal porous body and tightly seal the inner wall of the ceramic ring.

Step 4, installing the metal ring: a metal ring was welded to the ceramic ring so as to fit the metal ring over the ceramic ring at a temperature of 600° C. and under a vacuum atmosphere to form a sealing assembly A15. The scaling powder was Al—Si alloy.

Comparative Embodiment 1

This comparative embodiment is used to explain the sealing assembly and the method for preparing the sealing assembly according to the prior art.

A sealing assembly D1 was manufactured by means of glass package disclosed by CN201397827. The upper shell and the column made of Al, Cu were sealed by a glass.

Comparative Embodiment 2

This comparative embodiment is used to explain the sealing assembly and the method for preparing the sealing assembly according to the prior art.

A sealing assembly D2 was manufactured by means of ceramic sealing. A ceramic ring was welded to a column made of Al, Cu.

Testing

1. Air Impermeability of Sealing Assembly

The sealing assemblies A11-A15 and D1-D2 were located in a sealing clamp cavity. The connection part of the sealing assembly was exposed out of the sealing clamp cavity. The air pressure of the sealing clamp cavity was about 0.7 MPa for 3 min. Dripping water on the connection part of the sealing assembly was performed to test the air impermeability of the sealing assembly. If a bubble appeared, the sealing assembly was determined as air-leaking; while if no bubble appeared, the sealing assembly meeted the requirements of air impermeability. The results were recorded in Table 1.

TABLE 1

|  | Leaking or not |
| --- | --- |
| A11 | No leaking |
| A12 | No leaking |
| A13 | No leaking |
| A14 | No leaking |
| A15 | No leaking |
| D1 | No leaking |
| D2 | No leaking |

2. Thermal Shock Test

The sealing assemblies A11-A15 and D1-D2 were placed in cold water which has a temperature lower than 0° C. for 3 min. Then the sealing assemblies were quickly transferred to boiling water which has a temperature higher than 100° C. for 3 min, and this progress was repeated over and over again. The largest number of repeating cycle, after which the sealing assemblies can still meet the requirements of air impermeability is determined. The results were recorded in Table 2.

TABLE 2

|  | Times and Leaking or not |
| --- | --- |
| A11 | 400 times, no leaking |
| A12 | 400 times, no leaking |
| A13 | 400 times, no leaking |
| A14 | 400 times, no leaking |
| A15 | 400 times, no leaking |
| D1 | leaking after 107 times |
| D2 | leaking after 228 times |

Although explanatory embodiments have been shown and described, it would be appreciated by those skilled in the art that the above embodiments may not be construed to limit the present disclosure, and changes, alternatives, and modifications may be made in the embodiments without departing from spirit, principles and scope of the present disclosure.

What is claimed is:

1. A sealing assembly for a battery, comprising:
   a ceramic ring having a receiving hole, wherein the ceramic ring is selected from a group consisting of alumina ceramic ring, zirconia ceramic ring, aluminum nitride ceramic ring, boron nitride ceramic ring, silicon nitride ceramic ring, and alumina-zirconia composite ceramic ring;
   a metal ring fitted over the ceramic ring for sealing an open end of the battery,
   a column formed in the receiving hole which comprises a metal-metal composite,
   wherein the metal-metal composite comprises:
   a metal porous body, wherein the metal porous body comprises a first metal and a second metal, and the first metal is Cu; the second metal is at least one selected from a group consisting of W and Mo; and
   a metal material filled in pores of the metal porous body, wherein the metal material is Cu,
   wherein the expansion coefficient of the metal-metal composite is regulated to be approximate to the expansion coefficient of the ceramic ring.

2. The sealing assembly for a battery according to claim 1, wherein the metal material is filled in the pores of the metal porous body by means of melt infiltration.

3. The sealing assembly for a battery according to claim 1, wherein based on the total weight of the metal porous body, the content of the first metal is about 5 wt % to about 40 wt %, and the content of the second metal is about 60 wt % to about 95 wt %.

4. The sealing assembly for a battery according to claim 1, wherein the metal porous body comprises Cu and Mo, and based on the total weight of the metal porous body, the content of Cu is about 10 wt % to about 40 wt %, the content of Mo is about 60 wt % to about 90 wt %.

5. The sealing assembly for a battery according to claim 1, wherein the metal porous body comprises Cu and W, and based on the total weight of the metal porous body, the content of Cu is about 5 wt % to about 20 wt %; the content of W is about 80 wt % to about 95 wt %.

6. The sealing assembly for a battery according to claim 1, wherein the weight ratio of the metal material to the metal porous body is about (1 to 2):(1 to 19).

7. The sealing assembly for a battery according to claim 1, wherein the sealing assembly is configured as a sealing assembly for a negative pole of the battery.

8. A method for fabricating a sealing assembly of a battery, comprising:
   providing a ceramic ring having a receiving hole, wherein the ceramic ring is selected from a group consisting of alumina ceramic ring, zirconia ceramic ring, aluminum nitride ceramic ring, boron nitride ceramic ring, silicon nitride ceramic ring, and alumina-zirconia composite ceramic ring;

filing a mixture comprising a first metal and a second metal into the receiving hole of the ceramic ring, and sintering the mixture to obtain a metal porous body, wherein the first metal is Cu, the second metal is at least one selected from a group consisting of W and Mo;

filing a metal material into the receiving hole of the ceramic ring and above the sintered metal porous body, treating the metal material at a temperature above a melting point of the metal material to allow the melted metal material to infiltrate into the metal porous body, and obtaining a metal-metal composite after cooling, wherein the metal material is Cu; and welding a metal ring to the ceramic ring so as to fit the metal ring over the ceramic ring, wherein the expansion coefficient of the metal-metal composite is regulated to be approximate to the expansion coefficient of the ceramic ring.

9. The method according to claim 8, wherein based on the total weight of the metal porous body, the content of the first metal is about 5 wt % to about 40 wt %, and the content of the second metal is about 60 wt % to about 95 wt %.

10. The method according to claim 9, wherein the first metal is Cu, and the second metal is Mo, and based on the total weight of the metal porous body, the content of Cu is about 10 wt % to about 40 wt %, the content of Mo is about 60 wt % to about 90 wt %.

11. The method according to claim 9, wherein the first metal is Cu, and the second metal is W, and based on the total weight of the metal porous body, the content of Cu is about 5 wt % to about 20 wt %, the content of W is about 80 wt % to about 95 wt %.

12. The method according to claim 8, wherein the weight ratio of the metal material to the metal porous body is about (1 to 2):(1 to 19).

13. The method of claim 8, wherein the first metal and the second metal is sintered at the same time to obtain the metal porous body.

14. The method according to claim 8, wherein the sintering is performed under a temperature of about 1200 to about 1400° C. for about 1 to 3 hours.

15. The method according to claim 8, wherein the metal ring is welded to the ceramic ring by means of brazing, wherein the brazing is performed under a temperature of about 570 to about 660° C. for about 5 to 30 minutes under a vacuum or an inert atmosphere.

16. The method according to claim 15, wherein in the step of brazing, an Al—Si alloy is used, wherein the weight of Si is about 12 wt % or less.

17. A lithium ion battery, comprising:
a shell having at least one open end;
a sealing assembly for sealing the open end to form a sealed space; and
a pole core and an electrolyte solution received in the sealed space, wherein
the sealing assembly comprises:
a ceramic ring having a receiving hole, wherein the ceramic ring is selected from a group consisting of alumina ceramic ring, zirconia ceramic ring, aluminum nitride ceramic ring, boron nitride ceramic ring, silicon nitride ceramic ring, and alumina-zirconia composite ceramic ring,
a metal ring fitted over the ceramic ring for sealing an open end of the battery,
a column formed in the receiving hole which comprises a metal-metal composite,
wherein the metal-metal composite comprises:
a metal porous body, wherein the metal porous body comprises a first metal and a second metal, and the first metal is Cu; the second metal is at least one selected from a group consisting of W and Mo,
a metal material filled in pores of the metal porous body, wherein the metal material is Cu; and
the metal ring of the sealing assembly is connected with the shell, and the core column of the sealing assembly is connected with the pole core,
wherein the expansion coefficient of the metal-metal composite is regulated to be approximate to the expansion coefficient of the ceramic ring.

* * * * *